D. L. McCUNNINGHAM & E. M. WILSON.
POULTRY FOUNTAIN.
APPLICATION FILED MAY 13, 1911.

1,076,777.

Patented Oct. 28, 1913.
2 SHEETS—SHEET 1.

Witnesses

Inventors
D. L. McCunningham
E. M. Wilson
By
Attorney

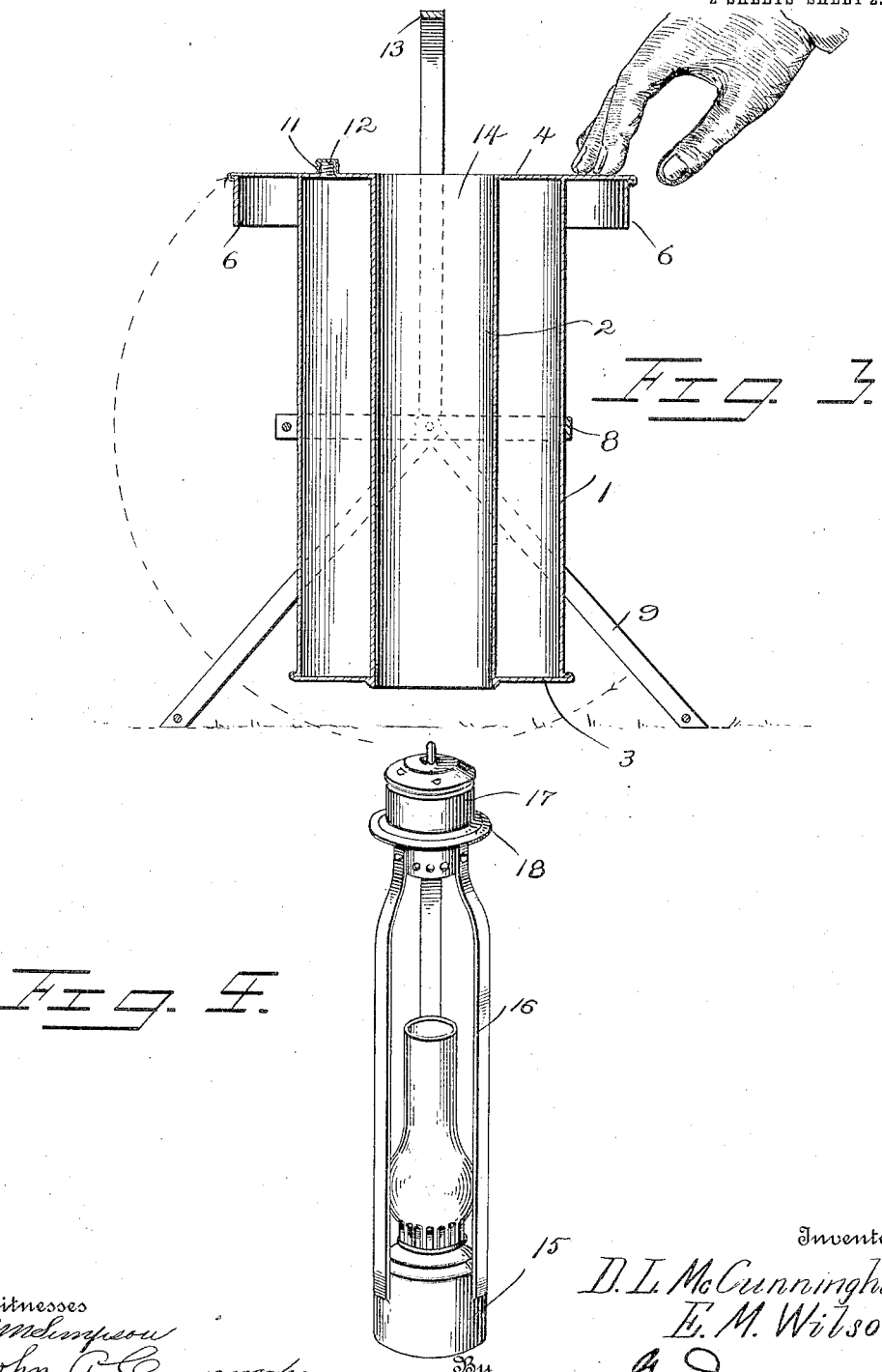

UNITED STATES PATENT OFFICE.

DANIEL L. McCUNNINGHAM AND EARL M. WILSON, OF SEDAN, KANSAS.

POULTRY-FOUNTAIN.

1,076,777.    Specification of Letters Patent.    Patented Oct. 28, 1913.

Application filed May 13, 1911. Serial No. 626,936.

*To all whom it may concern:*

Be it known that we, DANIEL L. McCUNNINGHAM and EARL M. WILSON, citizens of the United States, residing at Sedan, in the county of Chautauqua and State of Kansas, have invented certain new and useful Improvements in Poultry-Fountains, of which the following is a specification.

This invention relates to improvements in poultry fountains and the primary object in view is to construct a water fountain for poultry that may be left out-of-doors in cold weather without danger of the contents freezing from exposure to excessive cold.

Another object is to provide novel means for removably supporting a lamp or other heating means in the interior of an annular fountain.

A further object is to supply means for pivotally mounting the fountain on a supporting frame in such a manner that it may be easily and conveniently filled through the orifice in the bottom of the tank by revolving the fountain on its pivotal support until the bottom shall have assumed a reverse position as clearly illustrated in Figure 3, of the accompanying drawings.

A still further object is to provide, in combination with the lamp and lamp supporting members, a shield, or wind guard, for the purpose of preventing a gust of wind from extinguishing the flame of the lamp.

Figure 1:
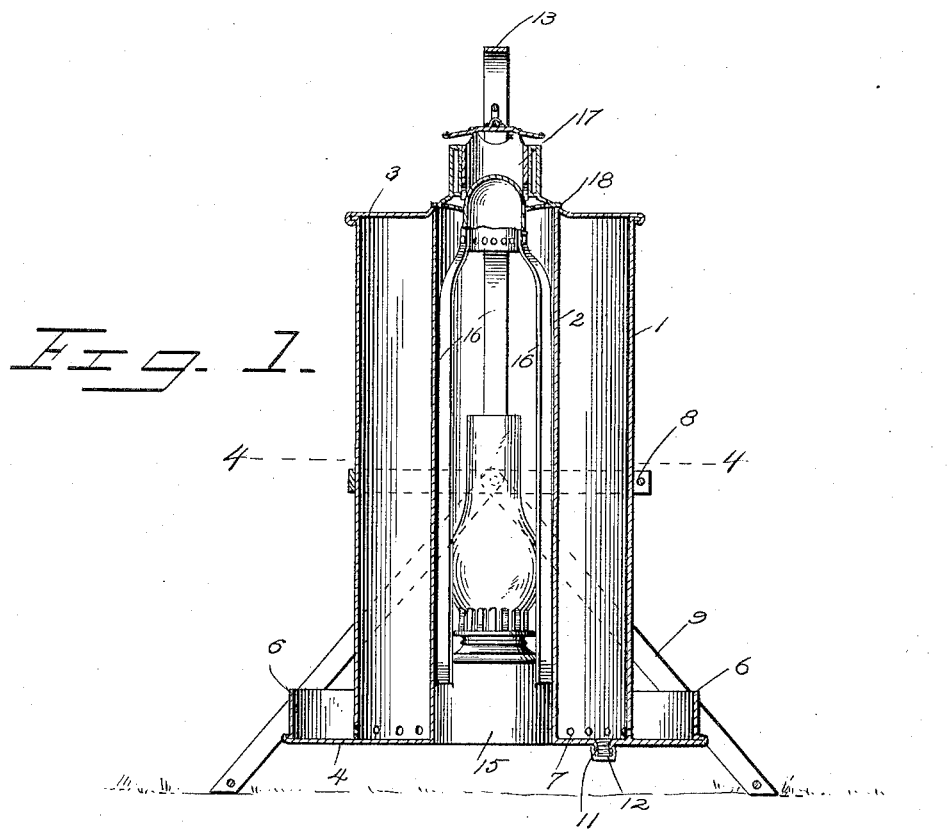
Figure 2:
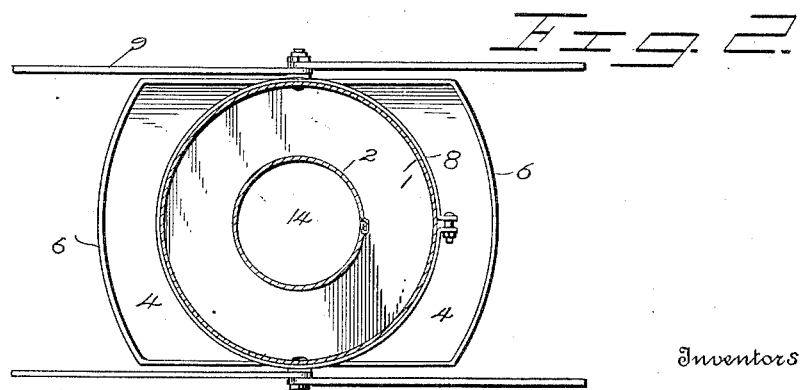

Fig. 1, illustrates a longitudinal section showing the lamp on the interior thereof, Fig. 2, is a cross section on the line 4—4 of Fig. 1, Fig. 3, illustrates a longitudinal section showing the tank inverted, Fig. 4, illustrates in perspective the lamp, lamp supporting members and wind guard.

Referring to the accompanying drawings, forming a part of the specification, wherein like numerals are employed to designate corresponding parts throughout the several views in which the numeral 1 indicates the outer wall of an annular tank, 2, the inner wall, 3, the top and 4, the bottom of same.

6, 6, are troughs integral with the bottom and 7 are perforations near the bottom of the tank for the admission of water to the troughs and also for the admission of air to the tank when the water in the said troughs shall have fallen below the upper side of the said perforations 7. A band 8, engages the tank substantially midway its height and is pivoted to a portable stand 9 in such a manner that the tank, when in position, will have a swinging motion, and may be inverted, as shown in Fig. 3, in order to be filled, without disengaging the tank from the stand or altering the position of the stand. The tank is filled by means of a port, 11, and the said port is sealed with screw stopper 12. A handle 13, is provided by which the fountain is carried from place to place. A flue 14, will be seen to occur by virtue of the annular construction of the tank. Into this flue is lowered a lamp 15, to which are secured metallic straps 16, which in turn depend from a wind guard 17. An annular collar 18, on the said wind guard is adapted to support the same in its adjusted position on the top part of the tank.

To operate the fountain the lamp is first removed from the flue in the tank by taking hold of the wind guard with the hand and pulling it upwardly until the lamp shall have left the flue, the tank can be then inverted as shown in Fig. 3, and filled with water through the port 11, after which the cap 12, is tightly screwed in place and the tank may be reversed to its normal position. The lamp is now lighted and allowed to drop down the flue and the wind guard is adjusted into position on top of the tank. As the tank is hermetically sealed except for the perforations in the trough, when it is swung to its normally erect position, after having been filled, the water from the interior of the tank will flow out of the said perforations into the troughs until it rises above the level of the perforations thereby closing the perforations and stopping the flow of water by excluding the air from the interior of the tank. When the fowls shall have drunk a sufficient quantity of water to expose the perforations to the air, a small amount of air will enter the perforations and a corresponding amount of water will flow into the troughs, this process being continued until the tank shall have been emptied. The flame of the lamp may be adjusted according to temperature of the weather and will burn with a steady flame imparting sufficient warmth to the water in the tank to keep it always above the freezing point.

Having described our drawing that which we claim as new and desire to protect by Letters Patent is:

1. A device of the kind described comprising a tank, a flue centrally formed from end to end of said tank, a lamp having frictional retaining means for holding it within said flue, and a wind guard secured to said retaining means and serving as a stop to limit its movement.

2. A device of the kind described comprising a tank, a flue centrally formed from end to end of said tank, a lamp, a plurality of straps secured in axial alinement with said lamp and arranged to frictionally engage the walls of said flue to support said lamp.

3. In a device of the kind described, a water tank having a central hollow chamber, a lamp suspending device embodying a wind guard, resilient straps depending from said wind guard for engagement with the inner wall of said hollow chamber for frictionally and adjustably supporting said lamp, and means carried by the wind guard for closing the upper end of said hollow chamber.

In testimony whereof we affix our signatures in presence of two witnesses.

DAN. L. McCUNNINGHAM.
EARL M. WILSON.

Witnesses:
N. E. COOKE,
P. F. EGGEN.

Copies of this patent may be obtained for five cents each, by addressing the "Commissioner of Patents, Washington, D. C."